E. A. APPELL.
VALVE FOR GAS AND LIQUID MEASURING DEVICES.
APPLICATION FILED FEB. 23, 1915.

1,200,572.

Patented Oct. 10, 1916.
2 SHEETS—SHEET 1.

WITNESSES
A. Laksy.
O. M. Demmer.

INVENTOR
Edward August Appell
BY Otto Fricke
ATTORNEY

E. A. APPELL.
VALVE FOR GAS AND LIQUID MEASURING DEVICES.
APPLICATION FILED FEB. 23, 1915.
1,200,572.
Patented Oct. 10, 1916.
2 SHEETS—SHEET 2.
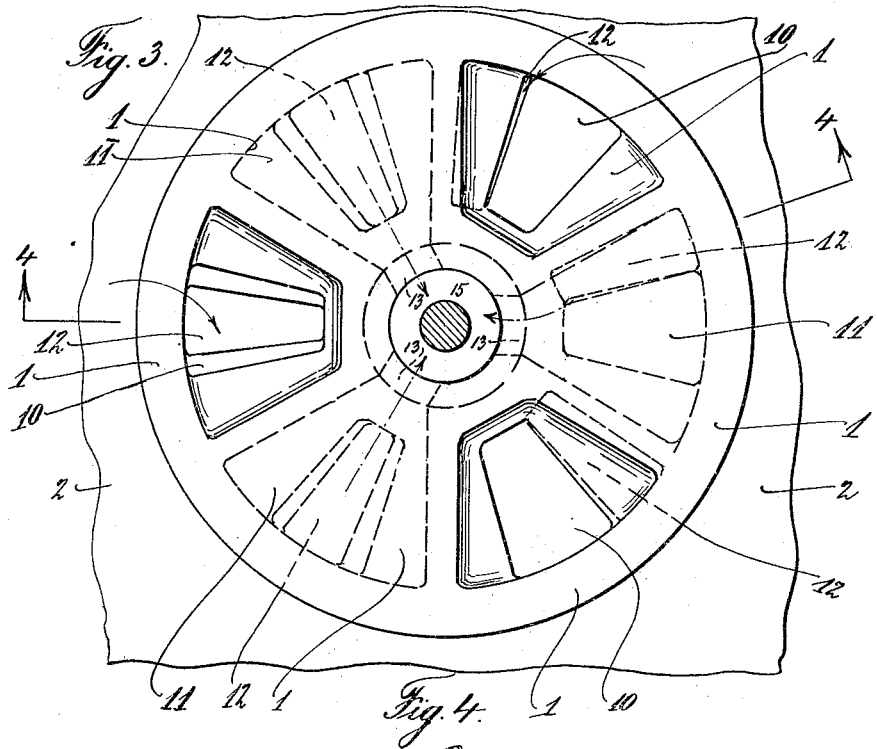
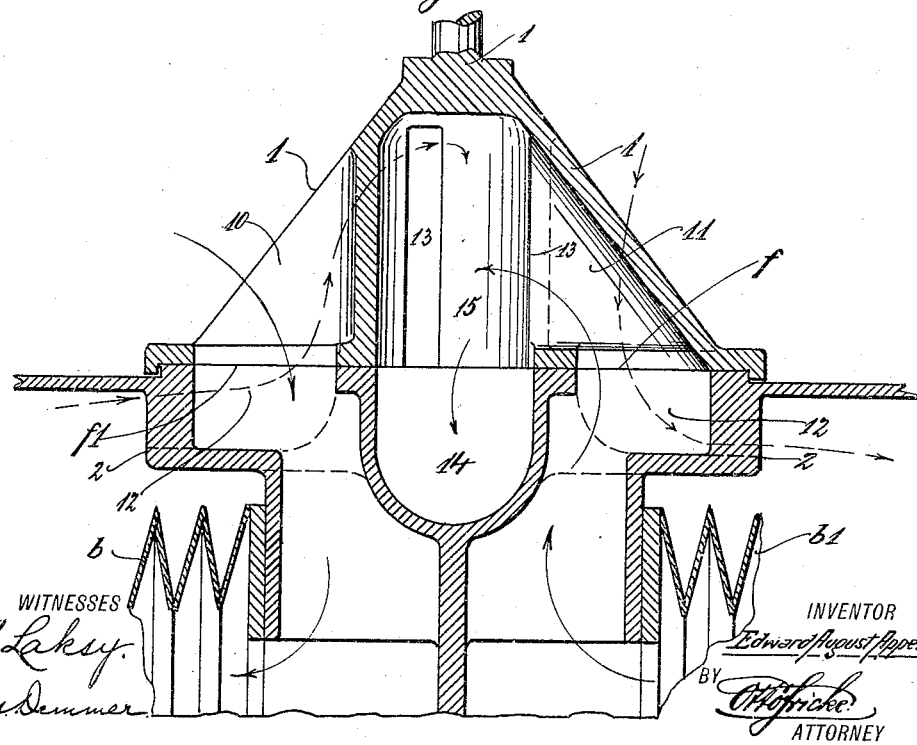
WITNESSES
INVENTOR
Edward August Appell
BY
ATTORNEY

UNITED STATES PATENT OFFICE.

EDWARD AUGUST APPELL, OF NEW YORK, N. Y.

VALVE FOR GAS AND LIQUID MEASURING DEVICES.

1,200,572.  Specification of Letters Patent.  Patented Oct. 10, 1916.

Application filed February 23, 1915. Serial No. 10,154.

*To all whom it may concern:*

Be it known that I, EDWARD AUGUST APPELL, a citizen of the United States, and a resident of the city of New York, in the county of Bronx and State of New York, have invented certain new and useful Improvements in Valves for Gas and Liquid Measuring Devices, of which the following is a specification.

The invention relates to liquid measuring devices such as shown and described in the Letters Patent of the United States No. 1,094,291, granted to me on April 21st, 1914.

The object of the invention is to provide a new and improved valve for such devices and to obtain better results over the present reciprocating sliding valves generally used in gas and liquid meters.

For the purpose mentioned use is made of a valve seat and a valve body, provided with inlets and outlets for the fluid and adapted to be connected to actuating and measuring devices.

A practical appliance and embodiment of the invention is represented in the accompanying drawings forming a part of this specification.

Similar characters of reference indicate corresponding parts in all the views.

Figure 1:
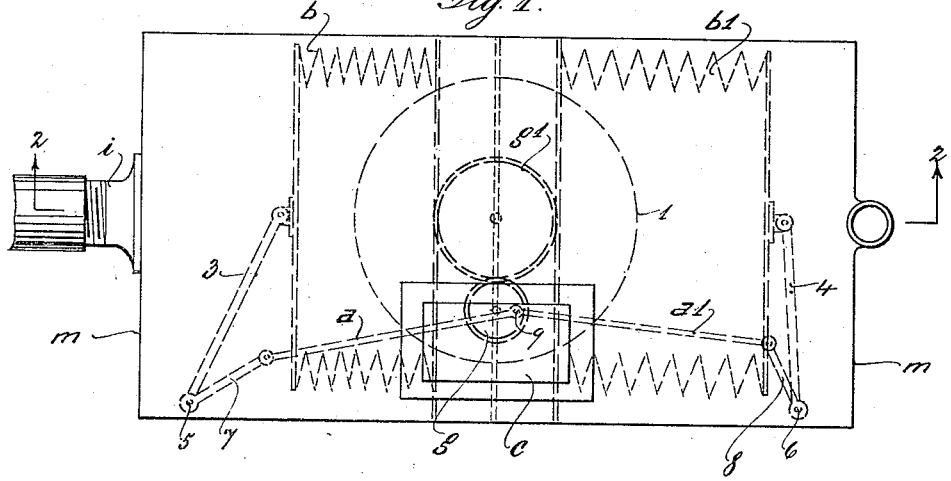
Figure 2:
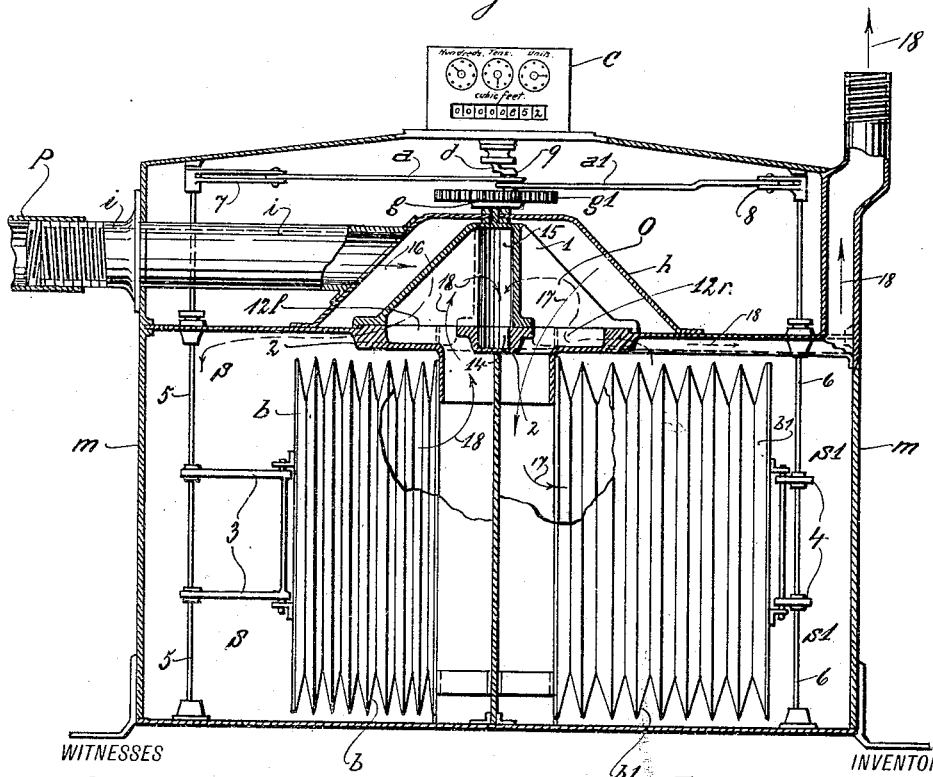

Figure 1 is a plan view of a measuring device, ($m$), the gas or liquid flowing through the same. Fig. 2 is a sectional elevation, the section being taken at line 2—2 of Fig. 1. Fig. 3 is an enlarged plan view showing the valve body and the valve seat. Fig. 4 is a section through the valve body and the seat on line 4—4 of Fig. 3. Figs. 1 to 4 disclose the new and improved valve body 1 and the valve seat 2. The purpose of the same is to direct the flow of the gas or liquid to be measured periodically to the inside or outside of the valve actuating bellows $b$ and $b^1$. The gas or liquid is flowing from the pipe line $p$ through the inlet pipe $i$ into the valve housing $h$ (Fig. 2.) On account of the construction and movement of the valve the gas or liquid coming from the housing $h$ actuates the measuring bellows $b$ and $b^1$ in a reciprocating movement.

The movement of the bellows $b$ and $b^1$ is transmitted through the levers 3 and 4 to the rods 5 and 6. These rods 5 and 6 transmit the movement to levers 7 and 8, whose fulcrums are the centers of rods 5 and 6. The other ends of the levers 7 and 8 are pivotally connected to connecting arms $a$ and $a^1$, which connecting arms operate on a journal 9 of the gear $g$. This gear $g$ transmits its rotary motion, which results from the reciprocating movement of the bellows $b$ and $b^1$ through the parts 3, 4—5, 6—7, 8 and $a$, $a^1$, (Figs. 1 and 2), to a gear of larger size "$q^1$." The gear $g^1$ is connected to the valve body 1 and thus imparts its rotary motion to the same.

In order to more reliably and properly direct the gas or liquid, the valve is of new and improved construction. Referring to Figs. 3 and 4, 1 is the valve body. This body has openings 10 and the same number of pockets or outlet ports "11" as it has openings or inlet ports (in this case three). The valve body 1 has a finished face $f$, which face works slidingly on the finished face of the valve seat "$f^1$". The two faces form a tight contact against gas or liquid. The plurality of outlet ports 11, which open at 13 toward a center outlet 15, and the inlet ports 10 in the valve body 1 are equally spaced. The valve seat has the same number of openings 12 (see Figs. 3 and 4) as the valve body has outlets and inlets. Both the valve seat 2 and the valve body 1 have outlets at the center.

14 designates the outlet of the seat 2 and 15 the one of the valve body 1.

The spacing of openings in the valve seat 2 is not equal, otherwise the valve would be inoperative. In other words, the ports of the seat 2 are arranged unsymmetrically, or in such a way that no two ports 12 in the seat 2 are opposite each other.

With reference to the measuring bellows $b$ and $b^1$, referring to Fig. 2, the valve operates as follows: The gas or liquid is filling the housing $h$ through the pipes $p$ and "$i$" and enters in the direction of arrow 16. From here the valve body 1 permits the liquid or gas to enter into the bellows $b^1$ through the port or opening "O," Fig. 2, in the direction of arrow 17, thus filling and thereby stretching the bellows $b^1$. At this moment the space $s^1$ in "$m$" is in connection with the outlet 15 through a port 11 of the valve body 1 and a port 12 of the seat 2, (not shown, as Fig. 2 is a central section only), and the gas or liquid in the same thus escapes. This bellows $b^1$ consequently turns the gear $g$ through the medium of the different levers heretofore mentioned. On the other hand, the valve while in this position permits the gas or liquid in bellows $b$, which has been previously filled to discharge into the outlet 15 in the center of the valve seat 2 through a valve outlet 11 in the direction of arrow 18, (see Fig. 2). The bellows $b$ is compressed by the gas or liquid flowing into the space "$s$" in "$m$" or onto the outside of bellows $b$ through another port 11 of the valve body 1 and a port 12 of the seat 2, (not shown in Fig. 2 as this is a central section only). On account of the contracting movement of bellows $b$ through the levers mentioned heretofore and through gears $g$ and $g^1$, the valve is turned. Thus both actions, the stretching and contracting ones, of bellows $b$ and $b^1$, turn the valve around the vertical axis of the valve body 1 and the valve seat 2. This turning of the valve body 1 continues consequently throughout a period of filling the bellows $b^1$ and discharging the bellows $b$ until a port 11 of the valve body 1 registers with that opening $12^r$ (Fig. 2) of seat 2 through which the gas or liquid entered into the bellows $b^1$, and until an inlet port of the valve body 1 registers with the opening $12^l$ of seat 2 through which the gas or liquid escaped into the outlet 15 before. Thus the whole operation is reversed, bellows $b^1$ discharging through the valve body 1 into the outlet 15, while bellows $b$ is filling from the housing $h$ through an inlet port 10 of valve body 1.

By the aforesaid: As long as liquid or gas is drawn from the meter through outlet 15 in the direction of the arrows 18 and supplied through pipe $p$, the construction of the valve causes the bellows $b$ and $b^1$ through the valve actuating parts to discharge and fill periodically; that means, while bellows $b$ is discharging into the outlet 15 the space "$s$" in "$m$" is filled and this bellows compressed. On the other hand, while bellows $b^1$ is filling the gas or liquid in the space "$s^1$" is discharging into the outlet 15 through the valve body 1 as this bellows enlarges itself in the space "$s^1$."

The turning of gear $g$ is transmitted by the rod "$d$" to a counter "$c$." Counter $c$ is of well known construction and the revolutions of gear $g$ which correspond to the movements of the bellows $b$ and $b^1$, whose volumes are known, indicates these on the dial of the counter $c$, which indications correspond to the volume of gas or liquid drawn from the measuring device.

I desire to have it understood, that the invention described may not be applied to measuring devices only, but also to other apparatuses requiring such valve.

Having thus described my invention, I claim as new and desire to secure by Letters Patent:—

The improved valve for the purpose specified, comprising a casing with admission and discharge openings, a valve seat and valve body inclosed in said casing, said body being rotatable on the seat and both body and seat being provided with a plurality of inlet and outlet ports, the ports of the seat being spaced unsymmetrically around a central outlet, two bellows also located in the said casing, and gearing and lever-and-rod mechanism operatively connecting the bellows with the shaft of the rotatable valve body, one bellows expanding as the other contracts, as shown and described.

Signed at New York, N. Y., in the county of Bronx and State of New York this ninth day of February A. D. 1915.

EDWARD AUGUST APPELL.

Witnesses:
OSKAR MÜLLER,
HYMON DAVIS.